April 17, 1962 G. P. LESSMANN 3,030,531
PROTECTIVE MEANS FOR ROTATING ELECTRICAL DEVICE
Filed Aug. 1, 1958 3 Sheets-Sheet 1

WITNESSES
John E. Hensley Jr.
Ernest P. Klipfel

INVENTOR
Gerhard P. Lessmann
BY
ATTORNEY

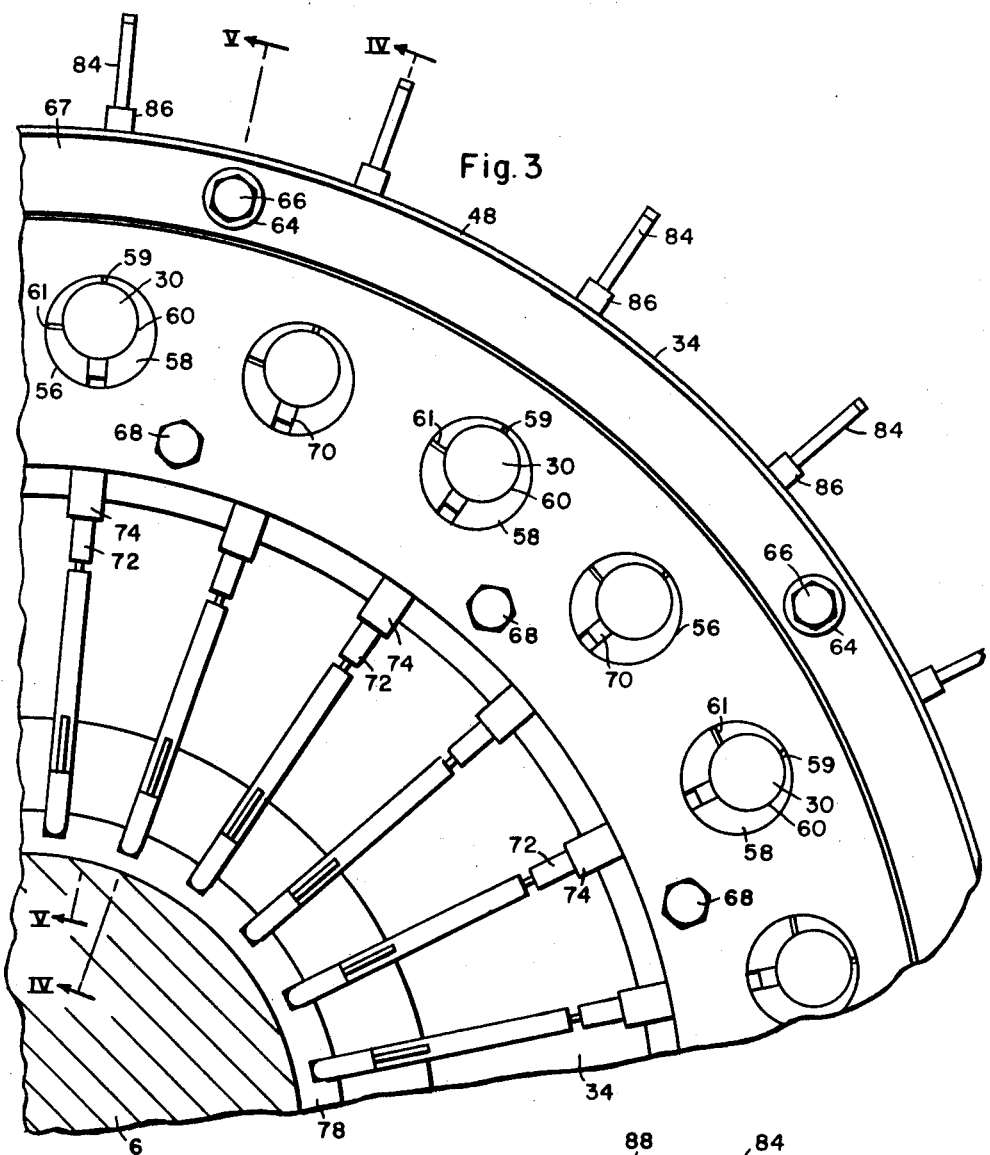
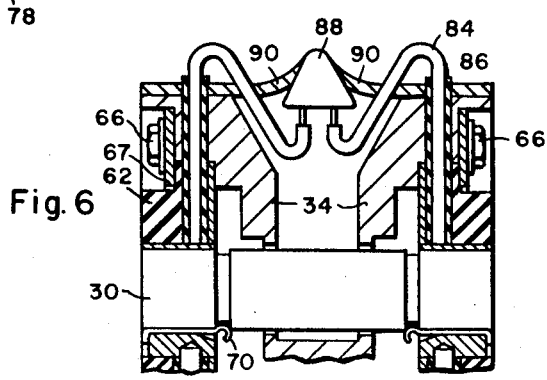

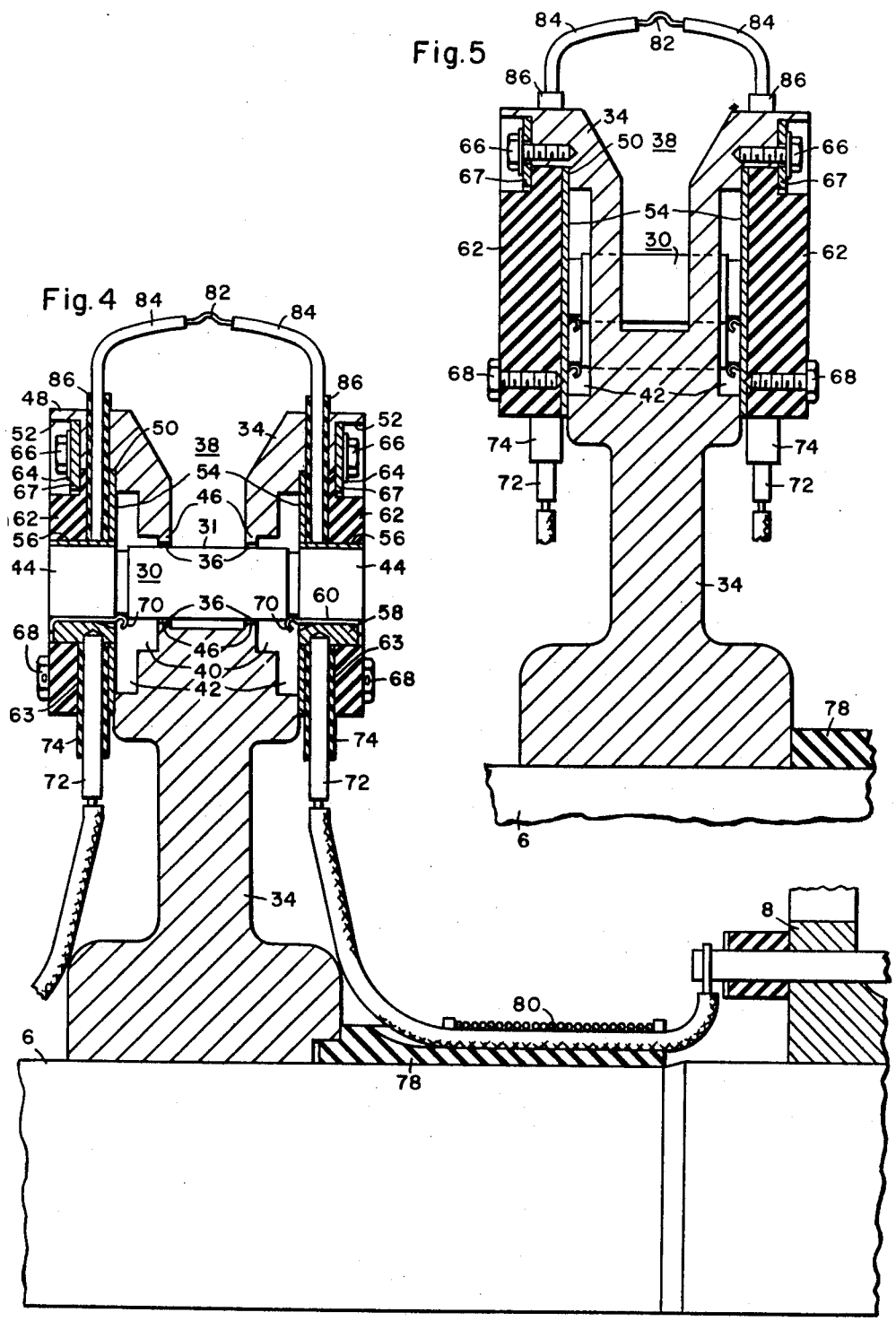

United States Patent Office 3,030,531
Patented Apr. 17, 1962

3,030,531
PROTECTIVE MEANS FOR ROTATING
ELECTRICAL DEVICE
Gerhard P. Lessmann, Pittsburgh, Pa., assignor to Westinghouse Electric Corporation, East Pittsburgh, Pa., a corporation of Pennsylvania
Filed Aug. 1, 1958, Ser. No. 752,467
12 Claims. (Cl. 310—68)

This invention relates to protective means for rotating electrical devices, and more particularly relates to a protective device capable of mounting for rotation with rotating electrical devices which may require overload or short-circuit protection.

Many electrical devices having rotating members require overload and short-circuit protective means for the portion of the circuit mounted on the rotating member. It would be advantageous in some instances to mount the protective means on the same rotating member as the electrical circuit. Such an advantage has particular application to synchronous alternating current machines of the brushless type.

The development of synchronous alternating current machines of the brushless type has been made possible by the use of rectifying means mounted on the rotating shaft of the machine. In such a machine an alternating current exciter is generally mounted on the same rotating member as the field winding of the main machine. A rotating rectifier assembly is mounted on the same rotating member for rectifying the alternating current output of the exciter for supplying direct current to the field winding. In this way, an alternating current machine is provided which requires no commutator, slip rings or brushes such as are necessary in the conventional type of synchronous alternating current machine.

Some types of brushless synchronous alternating current machines, such as turbogenerators, require continuity of operation of the highest degree. Particularly, in such an application, it is necessary to furnish protective means for the rectifier assembly. A breakdown of one or more rectifier elements in the rectifier assembly could result in loss of excitation to the turbogenerator. A protective means is required therefore to disconnect any element, branch or phase on which a fault condition may exist. Removal of the defective elements from the circuit would allow excitation to be maintained on the turbogenerator unit. Should an excessive number of rectifier elements break down, then a quick easy means must be made available for ascertaining the number of rectifier elements which are inoperative. This would allow determination of whether the machine can continue operating until the next shutdown maintenance period or whether shutdown of the machine should be immediate before excitation is lost completely.

A rotating protective means mounted directly on the rotating member of the synchronous alternating current machine must be capable of withstanding the high centrifugal forces due to the high speed of rotation, which is usually 3600 r.p.m. At the same time it must allow easy replacement of the operated or blown protective elements which have taken rectifier elements out of the circuit. Visual inspection of the protective means is desirable to determine the extent of its operation so that the location and number of rectifier elements cleared from the excitation circuit can easily be determined.

The principal object of my invention is to provide a rotating electrical device with a means for protection under fault conditions.

Another object of my invention is to provide a synchronous alternating current machine of the brushless type with a means for protection of the excitation system under fault conditions.

Another object of my invention is to provide a rotating fuse assembly capable of withstanding the high speed centrifugal forces usually encountered in turbogenerator applications.

Another object of my invention is to provide a rotating fuse assembly with visual means of determining the operation of each individual fuse element.

Further objects and advantages of my invention will be readily apparent from the following detailed description, taken in connection with the accompanying drawings, in which:

FIG. 3 is a fragmentary transverse view of the rotating fuse wheel of FIG. 1;

FIG. 4 is a fragmentary longitudinal view, in section, taken along the line IV—IV in FIG. 3;

FIG. 5 is a fragmentary longitudinal view taken along the line V—V in FIG. 3; and FIG. 6 is a fragmentary longitudinal view of another illustrative embodiment of my invention.

Figure 1:
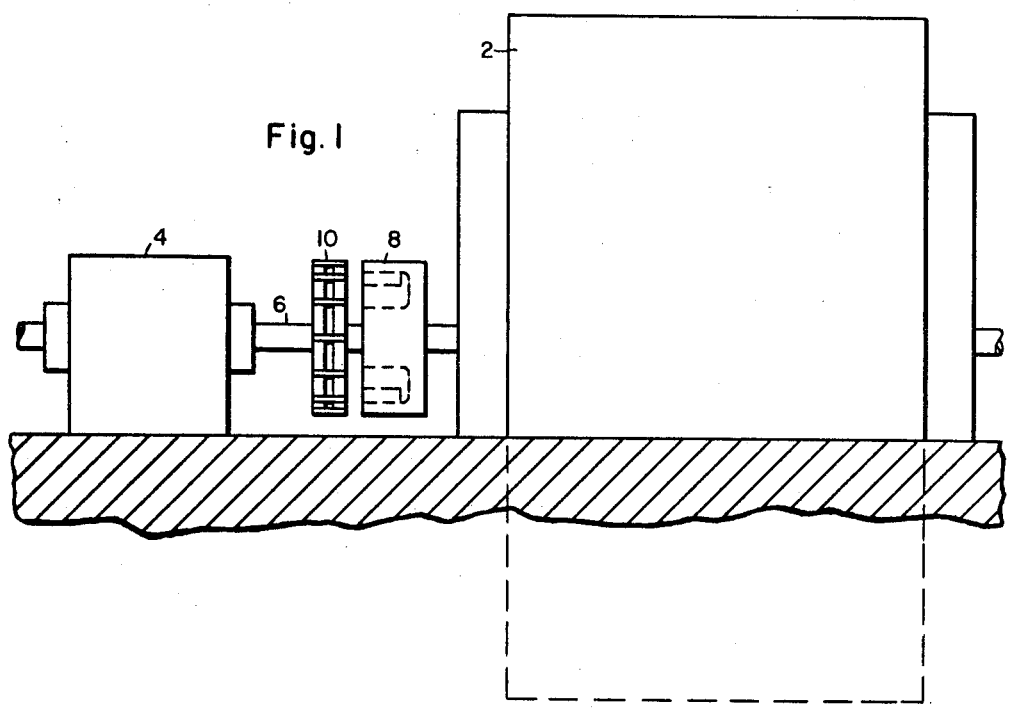
FIGURE 1 is an elevational view of an illustrative embodiment of my invention in the excitation system of a turbogenerator.

The invention is shown in the drawing, for the purpose of illustration, in a typical embodiment in the excitation system of a brushless alternating current turbogenerator. It is to be understood, however, that the present invention is not restricted in its application to turbogenerators, but is generally applicable to any synchronous machine of the brushless type or, in its broader aspects, for any rotating electrical device requiring protective means on the rotating member.

In the illustrated form of embodiment of the invention, a turbogenerator 2 and an alternating current main exciter 4 have a common rotating shaft 6 which shaft also provides means for driving the turbogenerator 2, usually by a steam turbine, not illustrated. A rectifier assembly 8 and fuse wheel 10, also mounted on the common rotating shaft 6 of the exciter 4 and turbogenerator 2, complete the typical embodiment shown.

Figure 2:
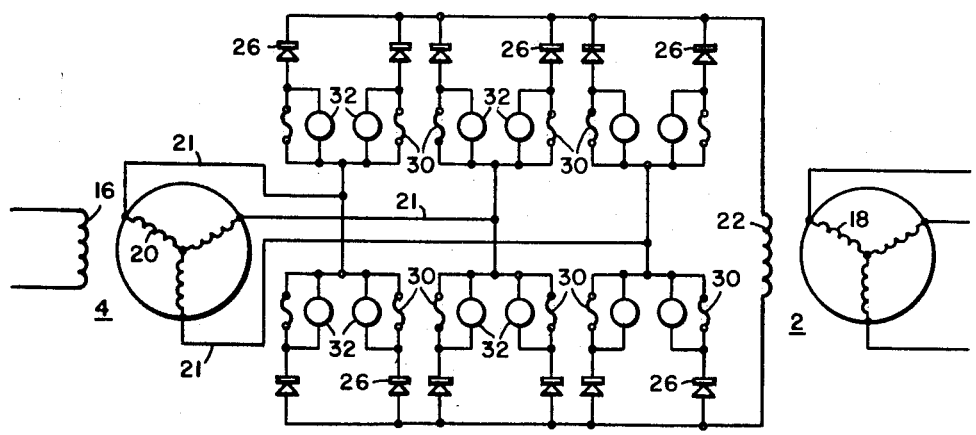
FIG. 2 is a schematic diagram of the electrical connections for the machine of FIG. 1.

As shown in FIG. 2, the turbogenerator 2 has a direct current rotating field winding 22 cooperating with a three-phase stationary armature winding 18. The alternating current main exciter 4 has a three-phase rotating armature winding 20 cooperating with a direct current stationary field winding 16. Direct current excitation to the stationary field winding 16 of the main exciter 4 may be provilded by any suitable means such as a pilot exciter of the permanent magnet type, not shown.

The three-phase full-wave rotating rectifier assembly 8 includes a plurality of rectifier elements 26, preferably silicon rectifiers, and provides means for rectifying the output of the three-phase alternating current armature winding 20 for the direct current field winding 22. Of course, any suitable rectifier circuit can be utilized. The physical construction of the rectifier assembly 8 may be of any desired type, one suitable construction being described and claimed in a copending application of Victor G. Sorokin et al., Serial No. 702,166, filed December 11, 1957. This completes the general construction of the brushless type synchronous machine.

As stated previously, a protective means is necessary or at least highly desirable in such an application because of the possibility that some of the rectifier elements 26 may individually break down and fail, requiring the removal of the faulty rectifier elements 26 from the excitation circuit. Removal of the faulty rectifier elements allows the remaining elements to carry the total load.

In general there will be a considerable number of rectifier elements 26 in parallel in each branch of the circuit so that upon failure of any individual element 26 or a reasonable number of them, the remaining elements will be capable of carrying the load for a reasonable period of time. If a particular branch or phase of rectifier elements becomes overloaded, these too are disconnected from the excitation circuit so that the remaining branches and phases carry the total load. In accordance with the present invention, the necessary protection is provided by means of the fuse wheel 10. The fuses are applied with sufficient rating to take care of rated overloads as well as a predetermined number of fuse failures due to breakdown of the rectifier elements 26 which they are assigned to protect.

The fuse wheel 10 must be capable of withstanding the high centrifugal forces accompanying 3600 r.p.m. operation. At the same time, visual means for determining the number of rectifier elements 26 still in the excitation circuit is highly desirable so that scheduled shutdowns can be determined.

The fuse wheel 10 containing the fuse assembly 28 is schematically illustrated in FIG. 2 with each fuse element 30 connected in series with a rectifying element 26. In parallel connection with each fuse element 30 is a means for visually indicating the operation of each individual fuse element 30. This means is shown in FIG. 2 as an indicating light 32, although, as will be described hereinafter, my invention contemplates the use of any suitabe means for gaining a visual indication of the operation of each fuse element 30.

The fuse wheel 10 containing the fuse assembly 28 is mounted on the rotating shaft 6 and electrically connected into the excitation circuit of the brushless type turbogenerator so as to protect the rectifier elements 26 in the rectifier assembly 8. The individual fuse elements 30 and the indicating means shown at 32 are mounted on the fuse wheel 10 in a manner illustrated in FIGS. 3 and 4.

A plurality of fuse elements 30 are mounted within a disk member 34 and distributed circumferentially about the shaft 6 on which the disk 34 is mounted. The disk 34 is preferably made of non-magnetic solid steel, or other material which will withstand the centrifugal forces to which it will be subjected. A plurality of openings 36 (FIG. 4) extending axially through the disk 34 contain the individual fuse elements 30. The elements 30 are supported and positioned therein by a circular shoulder internally formed at each end of each opening 36. Each opening 36 is eccentrically counterbored as shown at 40 to insure adequate insulating distances or creepage paths away from the electrical terminal ferrules 44 of each fuse element 30. Both sides of the annular disk member 34 have an annular depression 42 concentric with the shaft 6 thereby reducing the weight of the fuse wheel 10 as well as further ensuring adequate electrical clearances.

The disk 34 has a circumferential flange portion 48 on each side extending circumferentially around the disk with a first recess 50 and a larger second recess 52. A first insulating support ring 54 is mounted abutting the first recess 50 on each side of the disk member 34, concentric with the shaft 6, and has a plurality of circumferentially distributed openings 56 for the fuse elements 30. The openings 56 are larger than, and eccentric with respect to, the fuse elements 30 as to receive fuse sockets 58 with lead drops 72. The fuse sockets 58 each contain a terminal ferrule 44 located at each end of the fuse element 30. The circular depression 42 and eccentric counterbore 40 provide adequate electrical creepage distances between the disk 34 and the fuse sockets 58. A second insulating support ring 62, also with eccentric openings 56 with respect to the fuse elements 30 is secured to the disk 34 by abutting against the first support ring 54 and radially abutting the same recess 50. The socket member 58, having a general configuration of a circular plug or dowel with a non-concentric opening 60 therethrough into which the terminal ferrule 44 is inserted, is located within the openings 56 of the first insulating support ring 54 and the second insulating support ring 62.

The fuse sockets 58 are split in their thin section 59 at least once longitudinally the full length and traversely once partially at a location 90° from the thin section 59 and shown generally at 61 (FIG. 3). The fuse sockets 58 are split to give them springiness so as to hold them firmly in place and to firmly grip the terminal ferrule 44 at each end of the fuse element 30.

The lead drops 72 fit into radial slots 63 within the second support ring 62 with insulating tubes 74 disposed around each lead drop 72. Once assembled, the fuse sockets 58 containing a fuse element 30 cannot move axially. A spring clip 70 is brazed, or otherwise secured, to the bottom portion of the fuse socket 58 and inserted between the terminal ferrule 44 and the socket 58 to provide a resilient or cushion mount for each fuse element 30. The spring clip 70 absorbs or dampens any shock or vibration which may be transmitted through the fuse socket 58 to the fuse element 30. Of course, any suitable resilient means can be used. The thin section 59 may be extended axially and curled in a hook shape similar to the shape of the spring clip 70 to provide an elastic locking stop for the fuse.

The first support ring 54 and the second support ring 62 are prevented from moving axially by a circular washer 67 disposed coaxially about the shaft 6 and secured by bolting means shown as washers 64 and bolts 66. The circular washer 67 overlaps the second support ring 62 and the bolt 66 threads into the disk member 34, as can be more clearly seen in FIG. 5. Additional bolts 68 on a smaller diameter circle but concentric with the rotating shaft 6, secure the first support ring 54 and the second support ring 62 to the disk member 34 in a manner similar to the bolts 66.

Thus it may be seen that each fuse element 30 is securely held within its opening 36 while at the same time maintaining adequate electrical creepage distances between the terminal ferrules 44 and the retaining member 34. To make an electrical connection on each end of the fuse element 30, the lead 72 terminating in the fuse socket 58 and encased in an insulating tube 74, passes between the first support ring 54 and the second support ring 62. As the leads 72 leave the insulating tube 74, they are bound by means shown as twine 80 to an insulating bushing 78 mounted on the shaft 6. The insulating bushing 78 is keyed to the disk member 34 and furnishes insulating means between the leads 72 and the rotating shaft 6. The leads 72 are brought out of each fuse element 30 for connection to the rectifier assembly 8 on the one side and to the conductors 21 connected to the three-phase armature winding 20 on the other side.

Referring to FIG. 2, a fuse element 30 has been shown for each rectifier element 26. It is to be understood, however, that any arrangement of fuse elements for the protection of either one rectifier element or a series or phase of rectifier elements may be used. For the purpose of this disclosure, it may be assumed that a like number of rectifier elements are mounted on the rectifier assembly 8. It is to be understood however, that the fuse wheel 10 may contain fusing elements 30 for the protection of individual rectifier elements, or of branches or phases as may be desired.

As discussed previously, a visual means for detection of the operation of the fuse elements 30 while the fuse wheel 10 is rotating is required. This would provide a means for determining the number of rectifier elements 26 which are still in workable condition and connected in the excitation circuit of the turbogenerator 2.

The simplest manner of obtaining a visual indication as to the operation of any individual fuse element 30, can be had by means of a radial recess 38 around the circumference of the disk 34 and extending radially inward below the fuse elements 30 to allow direct viewing of the body 31 of each fuse element 30. The interior surface of the radial recess 38 is painted white. A fuse of the transparent type may be used and with suitable stroboscopic scanning equipment, which may be of any conventional type, any blown fuse element 30 can be detected during rotation by its black discoloration against the bright background which the disk 34 provides when the interior surface of the recess 38 is painted white.

Another means for detecting a blown fuse is shown in FIG. 4. A relatively thin fuse wire 82 is placed in parallel across each fuse element 30. Electrical connection of each fuse wire 82 across the fuse element 30 is accomplished by lead wires 84 making electrical contact with each socket 58 at each end of the fuse element 30. Each conductor 84 is insulated from the disk 34 by means of an insulating tube 86 which passes between the first support ring 54 and the second support ring 62. If a fuse element 30 blows, the fuse wire 82 connected thereto burns apart. The parted fuse wire 82 can easily be visually seen by the use of a stroboscope light which may scan each fuse wire 82 when the fuse wheel 10 is in operation.

Another means for obtaining a visual indication of the operation of any fuse element 30 is illustrated in FIG. 6. An indicating lamp 88 is supported in the place of the relatively small fuse wire 82 shown in FIGS. 4 and 5. The indicating light 88 is supported by any suitable means such as the mounting arms indicated at 90. Each indicating light 88 is connected in parallel across the corresponding fuse element 30 and is electrically connected in the same manner as the fuse wire 82 in the preceding figures. Upon blowing of a given fuse element 30, the indicating light 88 glows thereby furnishing a visual means for ascertaining the number of rectifier elements 26 which have broken down and have been disconnected from the excitation circuit. Here again a stroboscope light or other suitable means for viewing the indicating light may be used.

Thus, it can be seen that my invention provides means for protecting the rectifier assembly 8 used in the excitation circuit of a brushless type turbogenerator. The fuse wheel 10 provides means for removing from the excitation circuit any rectifier element 26 which may break down. In this manner excitation can be maintained on the turbogenerator 2. If an excessive number of rectifier elements 26 should break down, causing possible overload of the rectifier assembly 8, visual indicating means have been provided to forewarn the station operator. If desired, an audible alarm may also be used.

A sheet metal housing of the roll-away type with air passages for forced ventilation may enclose the fuse wheel 10 and rectifier assembly 8 if desired. Such an enclosure may be provided with glass inspection holes for inspection of the fuses or their indicating means as well as other maintenance inspections.

While my invention has been described with a certain degree of particularity, it is to be understood that the detailed construction is only by way of illustration, and that a rotating fuse wheel capable of protecting any rotating electrical device is herein contemplated within the spirit and scope of my invention. Further modifications, details and arrangement of the parts may be accomplished without departing from the spirit and scope of my invention and are intended to be included.

I claim as my invention:

1. A fuse assembly adapted for mounting on a rotating shaft, comprising a disk member mounted on said shaft, a plurality of fuse elements mounted on said disk member, circuit means for making individual electrical connection to each fuse element, and means in parallel with each fuse element for indicating the operation of the fuse element.

2. In combination, a disk member adapted to be mounted on a rotating shaft, a plurality of fuse elements axially disposed on said disk member, means for preventing axial and radial movement of said fuse elements, circuit means connected to each fuse element for connection to an external circuit, a like plurality of relatively thin fuse wires in parallel connection with each said fuse, and means for insulating said fuse elements from the disk member.

3. In combination, a disk member adapted to be mounted on a rotating shaft, a plurality of fuse elements axially disposed on said disk member, resilient spring means for securing each fuse element in position, a ring member secured to each side of the disk member preventing axial movement of the fuse elements, a circumferential flange portion on said disk member preventing radial movement of the ring members, circuit means connected to each fuse element for connection to an external circuit, a like plurality of indicating lamps in parallel connection with each said fuse, and means for insulating said fuse elements from the disk member.

4. In combination, a disk member adapted to be mounted on a rotating shaft, a plurality of fuse elements disposed on said disk member, resilient spring means for securing each fuse element in position, a ring member secured to each side of the disk member preventing axial movement of the fuse elements, circumferential flange portions on said disk member preventing radial movement of the ring members, circuit means connected to each fuse element for connection to an external circuit, said disk member being circumferentially recessed to expose the body of each fuse for inspection and means for insulating said fuse elements from the retaining wheel.

5. In combination, an alternating current dynamoelectric machine having a stationary armature winding and a rotatable field winding, an exciter for said machine having a stationary field winding and a rotatable armature winding, a rotatable rectifier assembly, a rotatable fuse assembly, means for mechanically connecting said rotatable field winding, said rotatable armature winding, said rectifier assembly and said fuse assembly for rotation together, and means for electrically connecting the rectifier assembly and the fuse assembly between the rotatable armature winding and the rotatable field winding to supply direct current excitation to the rotatable field winding.

6. In combination, an alternating current dynamoelectric machine having a stationary armature winding and a rotatable field winding, an exciter for said machine having a stationary field winding and a rotatable armature winding, a rotatable rectifier assembly including a plurality of rectifier elements, a rotatable fuse assembly including a plurality of fuses, means for electrically connecting the fuses to the rectifier elements, means for mechanically connecting said rotatable field winding, said rotatable armature winding, said rectifier assembly and said fuse assembly for rotation together, and means for electrically connecting the rectifier assembly and the fuse assembly between the rotatable armature winding and the rotatable field winding to supply direct current excitation to the rotatable field winding.

7. A rotatable fuse assembly comprising a disk member adapted to be mounted on a shaft for rotation therewith, said disk member having circumferentially spaced openings therein, a plurality of fuses disposed in said openings and held therein against radial movement, means on the disk member for restraining said fuses against axial movement, and means for making individual electrical connections to the fuses.

8. A rotatable fuse assembly comprising a disk member adapted to be mounted on a shaft for rotation therewith, said disk member having circumferentially spaced openings therein, a plurality of fuses disposed in said openings and held therein against radial movement, means on the disk member for restraining said fuses against axial movement, means for making individual electrical connections to the fuses, and individual indicating means associated with each fuse for indicating operation of the fuses.

9. A rotatable fuse assembly comprising a disk member adapted to be mounted on a shaft for rotation therewith, said disk member having a circumferential recess and having a plurality of circumferentially spaced axial openings intersecting said recess, a plurality of fuses disposed in said openings and held therein against radial movement, means on the disk member for restraining said fuses against axial movement, means for making individual electrical connections to the fuses and individual indicating means associated with each fuse for indicating operation of the fuses.

10. A rotatable fuse assembly comprising a disk member adapted to be mounted on a shaft for rotation therewith, said disk member having a circumferential recess extending around its periphery and having a plurality of circumferentially spaced axial openings intersecting said recess, a fuse disposed in each of said axial openings and held therein against radial movement, means on the disk member for restraining said fuses against axial movement in either direction, and means for making electrical connections to the fuses.

11. In combination, an alternating current dynamoelectric machine having a stationary armature winding and a rotatable field winding, an exciter for said machine having a stationary field winding and a rotatable armature winding, a rotatable rectifier assembly, a rotatable disk member, a plurality of fuses carried on said disk member and held thereon against radial and axial movement, means for electrically connecting said fuses to said rectifier assembly, means for mechanically connecting said rotatable field winding, said rotatable armature winding, said rectifier assembly and said rotatable disk member for rotation together, and means for electrically connecting the rectifier assembly and fuses between the rotatable armature winding and the rotatable field winding to supply direct current excitation to the rotatable field winding.

12. In combination, an alternating current dynamoelectric machine having a stationary armature winding and a rotatable field winding, an exciter for said machine having a stationary field winding and a rotatable armature winding, a rotatable rectifier assembly, a rotatable disk member having a plurality of circumferentially spaced openings therein, a plurality of fuses disposed in said openings and held therein against radial movement, means on the disk member for restraining said fuses against axial movement, means for electrically connecting said fuses to said rectifier assembly, means for mechanically connecting said rotatable field winding, said rotatable armature winding, said rectifier assembly and said rotatable disk member for rotation together, and means for electrically connecting the rectifier assembly and fuses between the rotatable armature winding and the rotatable field winding to supply direct current excitation to the rotatable field winding.

References Cited in the file of this patent
UNITED STATES PATENTS

| | | |
|---|---|---|
| 281,904 | McMahan | July 24, 1883 |
| 1,927,335 | Cole | Sept. 19, 1933 |
| 2,665,334 | Brainard | Jan. 5, 1954 |
| 2,722,652 | Brainard | Nov. 1, 1955 |